United States Patent Office 3,536,621
Patented Oct. 27, 1970

3,536,621
GREASE COMPOSITIONS FOR VACUUM AND FOR HIGH TEMPERATURE APPLICATIONS
John B. Christian, Yellow Springs, Ohio, assignor to the United States of America as represented by the Secretary of the Air Force
No Drawing. Filed Jan. 22, 1968, Ser. No. 699,372
Int. Cl. C10m 7/48, 7/30
U.S. Cl. 252—28
6 Claims

ABSTRACT OF THE DISCLOSURE

A grease composition comprises (1) a polyorganosiloxane base, (2) about 2–2.5 percent finely divided asbestos, and (3) about 15–25 percent finely divided 2,4-diamino-6-hydroxy-1,3,5-triazine. The grease is useful under heavy load conditions at atmospheric pressure or at vacuum in the $1 \times 10^{-9}$ Torr range at temperatures up to 400° F. and is useful under light loads at temperatures up to 600° F.

The invention described herein may be manufactured and used by or for the U.S. Government for governmental purposes without payment to me of any royalty thereon.

BACKGROUND OF THE INVENTION

There are two problems which have been particularly troublesome to workers in the art of formulating greases. The first of these is the formulating of a grease which can lubricate heavily loaded moving parts which are required to function under the vacuum conditions encountered in space. The second problem is to formulate a grease which can lubricate lightly loaded moving parts under atmospheric pressure but at temperatures as high as 600° F. such as can be reached by airframe and wheel bearing lubricants of supersonic aircraft.

A grease formulation suggested by the prior art, and of particular interest here, comprises about 65 percent of a polyorganosiloxane and about 35 percent of 2,4-diamino-6-hydroxy-1,3,5-triazine. The latter composition, although an advance in the art, does not perform at temperatures of 600° F. for significant periods of time and, perhaps even more disadvantageous, cannot be stored for significant periods of time. Thus, the need for grease compositions which, as stated above, must function under heavy loads under vacuum conditions at temperatures up to 400° F. or, alternatively, must function under light loads at temperatures up to 600° F.

OBJECTS

It is therefore an object of this invention to provide a grease which serves to lubricate heavily loaded moving parts which are required to function under vacuum conditions such as are encountered in space and at temperatures up to 400° F.

It is also an object of the invention to provide a grease which serves also to lubricate lightly loaded moving parts at temperatures up to 600° F.

It is a further object of the invention to provide a suitable grease comprising a polyorganosiloxane base, asbestos, and a 2,4-diamino-6-hydroxy-1,3,5-triazine which has a relatively higher proportion of said base than has been suggested heretofore.

SUMMARY OF THE INVENTION

I have now found that the foregoing and related objects can be attained in a grease composition comprising a polyorganosiloxane base, about 2–2.5 percent finely divided asbestos, and about 15–25 percent finely divided 2,4-diamino-6-hydroxy-1,3,5-triazine; and wherein said polyorganosiloxane is characterized by the following approximate physical properties:

Viscosity at 77° F.—598 centistokes
Viscosity at 100° F.—220.6 centistokes
Viscosity at 210° F.—27.3 centistokes
Viscosity at 400° F.—4.2 centistokes
Viscosity at 500° F.—2.4 centistokes
Viscosity at 600° F.—1.7 centistokes
Density at 77° F.—1.1108
Refractive index at 77° F.—1.5700
Flash point—685° F.
Fire point—745° F.
Pour point—+30° F.

As the polyorganosiloxane I prefer the methylphenylsiloxane having the following structural formula:

$$CH_3-\underset{\underset{R}{|}}{\overset{\overset{R}{|}}{Si}}-O-\left[\underset{\underset{R}{|}}{\overset{\overset{CH_3}{|}}{Si}}-O-\right]_n\underset{\underset{R}{|}}{\overset{\overset{R}{|}}{Si}}-O-CH_3$$

where R is a phenyl radical and $n$ is a small integer in the range of 1 to about 6. When $n$ is 1 the formula characteristics are of the monomer of methylphenylsiloxane which is equivalent to the dimer and trimer. I especially prefer to use either the monomer, dimer, or trimer, or mixture thereof, of methylphenylsiloxane in the compositions of the invention.

The 2,4-diamino-6-hydroxy-1,3,5-triazine is used in finely divided form and, preferably, should have a density of about 1.71 and a surface area of about 3.5–4.9 square meters/gram. Although from about 15 percent to about 25 percent of the triazine can be used with advantage in the composition, maximum advantage is gained with about 20 percent. Use of proportions of said triazine of less than about 25 percent permits the use of higher proportions of the polysiloxane as compared to prior art usage.

The asbestos, similarly, is used in finely divided form, and preferably, should have a density of about 2.39–2.47 and a surface area of about 52 square meters per gram. The asbestos is used in a proportion of about 2–2.5 percent. With less than 2 percent the composition is not sufficiently thickened and with more than about 2.5 percent there is a sacrifice of lubrication properties.

The constituents of the grease can be mixed for about 10–15 minutes using conventional mechanical stirring. The resulting slurry may then be passed about 3–5 times through a 3-roll paint mill with the roller opening set at 0.002 inch at room temperature.

EXAMPLE

A preferred composition of the invention was made up as follows: A mixture of the monomer, dimer, and trimer of the polyorganosiloxane (77.8 parts by weight); asbestos (2.2 parts) having a density of about 2.40 and a surface area of 52.3 square meters per gram; and 2,4-diamino-6-hydroxy-1,3,5-triazine (20 parts) having a density of 1.7123 and a surface area of about 4 square meters per gram were mixed, with stirring, for 15 minutes. The resulting slurry was passed five times through a 3-roll mill with the roller opening set at 0.002 inch at room temperature. The resulting grease composition had the following properties:

Worked penetration—324–350
Evaporation, 22 hours at 500° F.—4.5–5.0%
Evaporation, 22 hours at 600° F.—19.5–21.0%
Oil Separation, 30 hours at 500° F.—14.5–15.5%
Oil Separation, 30 hours at 600° F.—19.0–20.5%
Pope Spindle test at 600° F. (10,000 r.p.m., 5 pounds load)—183 hours Oscillation test under vacuum—500,000+cycles
Worked penetration after 6 month storage at 77° F.—324–350 (no change)

Federal Test Method Standard No. 791A test methods were used for conducting the majority of the tests. Worked penetration, method 313.2; evaporation, method 351.2; oil separation, method 321.2; Pope Spindle test, method 333; worked penetration after 6 months storage at 77° F. method 313.2. The oscillation bearing test under $1 \times 10^{-9}$ Torr was conducted using a full complement, 440C stainless steel bearing of 1.3125 inch bore with 38⅛" balls, and provided with shields. The grease lubricated bearings were tested at ±20° oscillations and 30 c.p.m. at loads up to 3600 pounds at 70° F.

The grease described in the foregoing example can be compared with a prior art formulation comprising 65 percent of the same polyorganosiloxane and 35 percent 2,4-diamino-6-hydroxy-1,3,5-triazine (no asbestos). When tested the latter composition had an initial worked penetration of 275. After 6 months storage at 77° F. the composition had a worked penetration of more than 400, indicating that the grease had become too soft for use and could not be stored for any significant period of time. Performance of this grease in the Pope Spindle at 600° F. (10,000 r.p.m., 5 pounds load) was also poor, failing to perform after only 74 hours.

The grease composition of my invention finds particularly utility as an airframe and wheel bearing lubricant, such as is required on supersonic aircraft, and in those applications where lubricants are required to function under heavy loads and under deep vacuum conditions at temperatures up to 400° F. or, alternatively, under light loads at temperatures up to about 600° F.

It is to be understood that while specific examples describe preferred embodiments of my invention, they are for the purpose of illustration only, that the products and methods of the invention are not limited to the precise details and conditions disclosed, and that various changes may be made therein without departing from the spirit of the invention which is defined by the following claims.

I claim:

1. A grease composition suitable for use at high temperatures, said composition comprising a methylphenylsiloxane base; about 2–2.5 percent finely divided asbestos; and about 15–25 percent finely divided 2,4-diamino-6-hydroxy-1,3,5-triazine; and wherein said base is characterized by the following approximate physical properties:

Viscosity at 77° F.—598 centistokes
Viscosity at 100° F.—220.6 centistokes
Viscosity at 210° F.—27.3 centistokes
Viscosity at 400° F.—4.2 centistokes
Viscosity at 500° F.—2.4 centistokes
Viscosity at 600° F.—1.7 centistokes
Density at 77° F—1.1108
Refractive index at 77° F.—1.5700
Flash point—685° F.
Fire point—745° F.
Pour point—+30° F.

2. The composition according to claim 1 which comprises about 20 percent, 2,4-diamino-6-hydroxy-1,3,5-triazine.

3. The composition according to claim 1 which comprises about 2.2 percent asbestos; about 20 percent 2,4-diamino-6-hydroxy-1,3,5-triazine; and about 77.8 percent of a polymethylphenylsiloxane.

4. The composition according to claim 1 wherein the asbestos has a density of about 2.39–2.47 and a surface area of about 52 square meters per gram.

5. The composition according to claim 1 wherein said triazine has a density of about 1.712 and a surface area of about 3.5–4.9 square meters per gram.

6. The composition according to claim 1 wherein the asbestos has a density of about 2.39–2.47 and a surface area of about 52 square meters per gram; wherein said triazine has a density of about 1.712 and a surface area of about 3.5–4.9 square meters per gram; and wherein said siloxane is selected from the group consisting of the monomer, dimer, trimer, and mixtures thereof, of methylphenylsiloxane.

References Cited

UNITED STATES PATENTS

| | | | |
|---|---|---|---|
| 2,268,234 | 12/1941 | Adams et al. | 252—13 |
| 2,984,624 | 5/1961 | Halter et al. | 252—28 |
| 3,010,896 | 11/1961 | Odell et al. | 252—13 |
| 3,433,743 | 3/1969 | Morway et al. | 252—13 |

DANIEL E. WYMAN, Primary Examiner

I. VAUGHN, Assistant Examiner

U.S. Cl. X.R.

252—13, 49.6